US008913302B2

(12) United States Patent  (10) Patent No.: US 8,913,302 B2
Saito  (45) Date of Patent: Dec. 16, 2014

(54) IMAGE PROCESSING APPARATUS, IMAGE FORMING APPARATUS AND COMPUTER-READABLE MEDIUM FOR OBTAINING DUPLICATES OF A DOCUMENT IN A BOUND FORM

(75) Inventor: Taku Saito, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 1872 days.

(21) Appl. No.: 11/898,148

(22) Filed: Sep. 10, 2007

(65) Prior Publication Data

US 2008/0259410 A1    Oct. 23, 2008

(30) Foreign Application Priority Data

Apr. 19, 2007 (JP) ................. 2007-110573

(51) Int. Cl.
 *H04N 1/387* (2006.01)
 *H04N 1/00* (2006.01)
 *H04N 1/32* (2006.01)

(52) U.S. Cl.
 CPC ......... *H04N 1/3873* (2013.01); *H04N 1/00795* (2013.01); *H04N 1/00811* (2013.01); *H04N 1/32358* (2013.01); *H04N 1/32464* (2013.01); *H04N 2201/0091* (2013.01); *H04N 2201/3226* (2013.01); *H04N 2201/3232* (2013.01)
 USPC .......................................... 358/453; 399/193

(58) Field of Classification Search
 CPC .................. H04N 1/0081; H04N 1/32464
 USPC ........... 399/16, 82, 193; 358/1.15, 1.16, 1.18, 358/450, 474, 527; 270/58.09
 See application file for complete search history.

(56) References Cited

U.S. PATENT DOCUMENTS

| 4,941,017 | A * | 7/1990 | Mishima et al. ............... 399/193 |
| 6,336,011 | B1 * | 1/2002 | Sumio et al. ................... 399/82 |
| 6,339,685 | B1 * | 1/2002 | Okamoto et al. ............... 399/16 |
| 6,559,967 | B1 * | 5/2003 | Akiba et al. ................. 358/1.16 |
| 7,800,795 | B2 * | 9/2010 | Kelly et al. ................... 358/474 |
| 2002/0186413 | A1* | 12/2002 | Ito ................................ 358/1.18 |

(Continued)

FOREIGN PATENT DOCUMENTS

| JP | 2003-198832 | 7/2003 |
| JP | 2003-209682 | 7/2003 |
| JP | 2005-51382 | 2/2005 |
| JP | 2007-13799 | 1/2007 |

OTHER PUBLICATIONS

Notification of Reason for Refusal in corresponding Japanese Patent Application No. 2007-110573, mailed Jul. 12, 2011.

*Primary Examiner* — Nicholas Pachol
(74) *Attorney, Agent, or Firm* — Lucas & Mercanti, LLP (57) ABSTRACT

Disclosed is an image processing apparatus including a reading section to read a document and to obtain image data, the document including a plurality of sheets and having a binding portion; a storage section to store the image data; an operating section to accept an operating instruction to designate a position of the binding portion of the document, to designate a page order on one side of the binding portion of the document, and to designate one face out of faces of the sheets, from which a reading operation is started; and a controller, in accordance with the designation, to determine an image area corresponding to one page of the document, to divide the image data into pieces of page image data based on the image area, and to respectively give identifiers to the pieces of the divided page image data following a page order of the document.

14 Claims, 9 Drawing Sheets

(56) References Cited

U.S. PATENT DOCUMENTS

| | | | |
|---|---|---|---|
| 2004/0207871 A1* | 10/2004 | Ando | 358/1.15 |
| 2007/0057426 A1* | 3/2007 | Tao et al. | 270/58.09 |
| 2007/0091354 A1* | 4/2007 | Sakemi | 358/1.15 |
| 2007/0216973 A1* | 9/2007 | Tagawa | 358/527 |
| 2007/0253031 A1* | 11/2007 | Fan | 358/1.18 |
| 2008/0018950 A1* | 1/2008 | Kobayashi | 358/450 |

* cited by examiner

SADDLE STITCH

IMAGE PROCESSING APPARATUS, IMAGE FORMING APPARATUS AND COMPUTER-READABLE MEDIUM FOR OBTAINING DUPLICATES OF A DOCUMENT IN A BOUND FORM

BACKGROUND OF THE INVENTION

1. Field of the Invention

The present invention relates to an image processing apparatus for processing an image based on a reading image of a document, an image forming apparatus having the image processing apparatus, and a computer-readable medium embodying a program for realizing a function of the image processing.

2. Description of Related Art

When a brochure-shaped document is copied to make a brochure, there are different conventional methods. One such method is that the document is copied page by page (double-sided copy if possible). The other method is that an image on two-page spread of the document is copied on one paper and the paper is folded in half at the center and is bound.

In the former method, however, a user must repeat the following operation: a user turns pages of the document, places the document on a copier, and presses a copy button. This operation is extremely troublesome for users. In the latter method, although the copy time is reduced to half as compared with the former method, the copied papers must be folded in half, which is troublesome for users, and odd pages and even pages of the copied papers in a brochure form are deviated from the actual document by one page. Further, since single-sided copying is performed in the latter method, there arises a problem that the copied papers become thicker than the original document.

When copying a so-called saddle stitched brochure, especially which is stapled, it is easy to make a duplicate copy of the brochure because the brochure can relatively easy be disassembled and reassembled. That is, by removing the staples from a binding portion of the brochure, the brochure can be disassembled into sheets, and the separated sheets are copied.

It is conceived that an ideal method for obtaining a saddle stitched brochure from copied papers is to use a saddle stitching machine. The saddle stitching machine, however, has limited uses and is cost-prohibitive. Thus, an image forming apparatus having the saddle stitching machine does not become widespread. Therefore, to form the saddle stitched brochure, it is necessary to stack half-folded papers, to paste creases of the papers to each other, or to staple the papers together. Such operations, however, are troublesome for users. When creases of the half-folded papers are stapled together, there is a problem that strength becomes insufficient and pages are not uniform as compared with a case in which one edges of papers are stapled.

It also seems possible to stitch one edges of papers to form a brochure in which two pages of a document are copied on one face of one paper without folding the papers into two. In this case, however, there arises a problem that the brochure is lacking in continuity in contents corresponding to two pages of the original document, which are copied on one face of one paper, and usability is extremely inferior.

To solve such a problem, Japanese Patent Application Laid-open No. 2003-198832 discloses a technique in which a saddle stitched document is read to obtain images of the document, each of the images is rearranged according to page number for image formation. Japanese Patent Application Laid-open No. 2005-51382 discloses a technique which realizes a division copy in an appropriate page order with respect to various documents and their set state. Japanese Patent Application Laid-open No. 2003-209682 discloses a technique for setting that each page of a document is arranged on either a right page or a left page in two-page spread when bookbinding of pamphlets or the like. This makes it possible to produce copies of the document by laying out a desired page on a specified page without extra work such as insertion of blank pages.

The saddle stitched document is distinguished between first halves and latter halves in page order with respect to a binding portion of the document as a boundary. However, even if any of the above-described techniques is applied, a position of the binding portion of the document cannot be determined and the document cannot be distinguished between first halves and latter halves in page order with respect to the binding portion as a boundary. This makes it difficult to make full use of the features of the saddle stitched document when copying the document. Thus, there is a problem that substantially the same duplicate as the document cannot be obtained.

SUMMARY OF THE INVENTION

It is, therefore, a main object of the present invention to easily obtain substantially the same duplicate as a document in a bound form by dividing image data of the document into pieces of page image data page by page and respectively giving identifiers to the pieces of the divided page image data following a page order of the document.

To achieve at least one of the above objects, an image processing apparatus reflecting a first aspect of the present invention comprises:

a reading section to read a brochure-shaped document and to obtain image data of the document, the document including a plurality of sheets and having a binding portion along a line dividing the document into two;

a storage section to store the image data obtained by the reading section;

an operating section to accept an operating instruction to designate a position of the binding portion of the document, to designate high and low in page number between two pages, partitioned along the binding portion, on one face of each of the sheets or to designate ascending order or descending order of page number on one side of the binding portion of a stack of the sheets, and to designate one face out of faces of the sheets, from which a reading operation by the reading section is started; and a controller, in accordance with the designation through the operating section, to determine an image area corresponding to one page of the document, to divide the image data into pieces of page image data page by page based on the image area and to restore the pieces of the divided page image data in the storage section, and to respectively give identifiers to the pieces of the divided page image data following a page order of the document.

It is desirable that in the image processing apparatus reflecting the first aspect of the present invention, the controller determines one edge of a paper on which an image is to be formed based on the image data, as a binding portion of the paper based on the position of the binding portion of the document.

An image processing apparatus reflecting a second aspect of the present invention comprises:

a reading section to read a brochure-shaped document and to obtain image data of the document, the document including a plurality of sheets and having a binding portion along a line dividing the document into two;

a first storage section to store the image data obtained by the reading section;

a second storage section to store first setting information on a position of the binding portion of the document, to store second setting information on high and low in page number between two pages, partitioned along the binding portion, on one face of each of the sheets, or ascending order or descending order of page number on one side of the binding portion of a stack of the sheets, and to store third setting information on one face out of faces of the sheets, from which a reading operation by the reading section is started; and a controller, in accordance with the first to third setting information stored in the second storage section, to determine an image area corresponding to one page of the document, to divide the image data into pieces of page image data page by page based on the image area and to restore the pieces of the divided page image data in the first storage section, and to respectively give identifiers to the pieces of the divided page image data following a page order of the document.

It is desirable that in the image processing apparatus reflecting the second aspect of the present invention, the controller determines one edge of a paper on which an image is to be formed based on the image data, as a binding portion of the paper based on the position of the binding portion of the document.

It is desirable that in the image processing apparatus reflecting the first aspect of the present invention, a vertical direction or a lateral direction of the document is further designated through the operating section, and the controller determines one edge of a paper on which an image is to be formed based on the image data, as a binding portion of the paper based on the directional designation through the operating section.

It is desirable that in the image processing apparatus reflecting the first aspect of the present invention, a position of a binding portion of a paper on which an image is to be formed based on the image data, is further designated through the operating section, and the controller determines one edge of the paper as the binding portion of the paper based on the binding portion designation through the operating section.

An image forming apparatus reflecting a third aspect of the present invention comprises:

the image processing apparatus reflecting the first aspect of the present invention; and an image forming section to respectively form images on papers based on the pieces of the divided page image data and the corresponding identifiers.

An image forming apparatus reflecting a fourth aspect of the present invention comprises:

the image processing apparatus reflecting the second aspect of the present invention; and an image forming section to respectively form images on papers based on the pieces of the divided page image data and the corresponding identifiers.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

A preferred embodiment of the present invention will be explained below with reference to the drawings.

In the following embodiment, a stack of papers, on which a document is copied, will be called "a stack of copied papers", and if post processing such as staple processing and pasting processing is performed on the stack of copied papers, the stack of copied papers will be called a "duplicate".

First, a structure of the embodiment will be explained.

Figure 1:
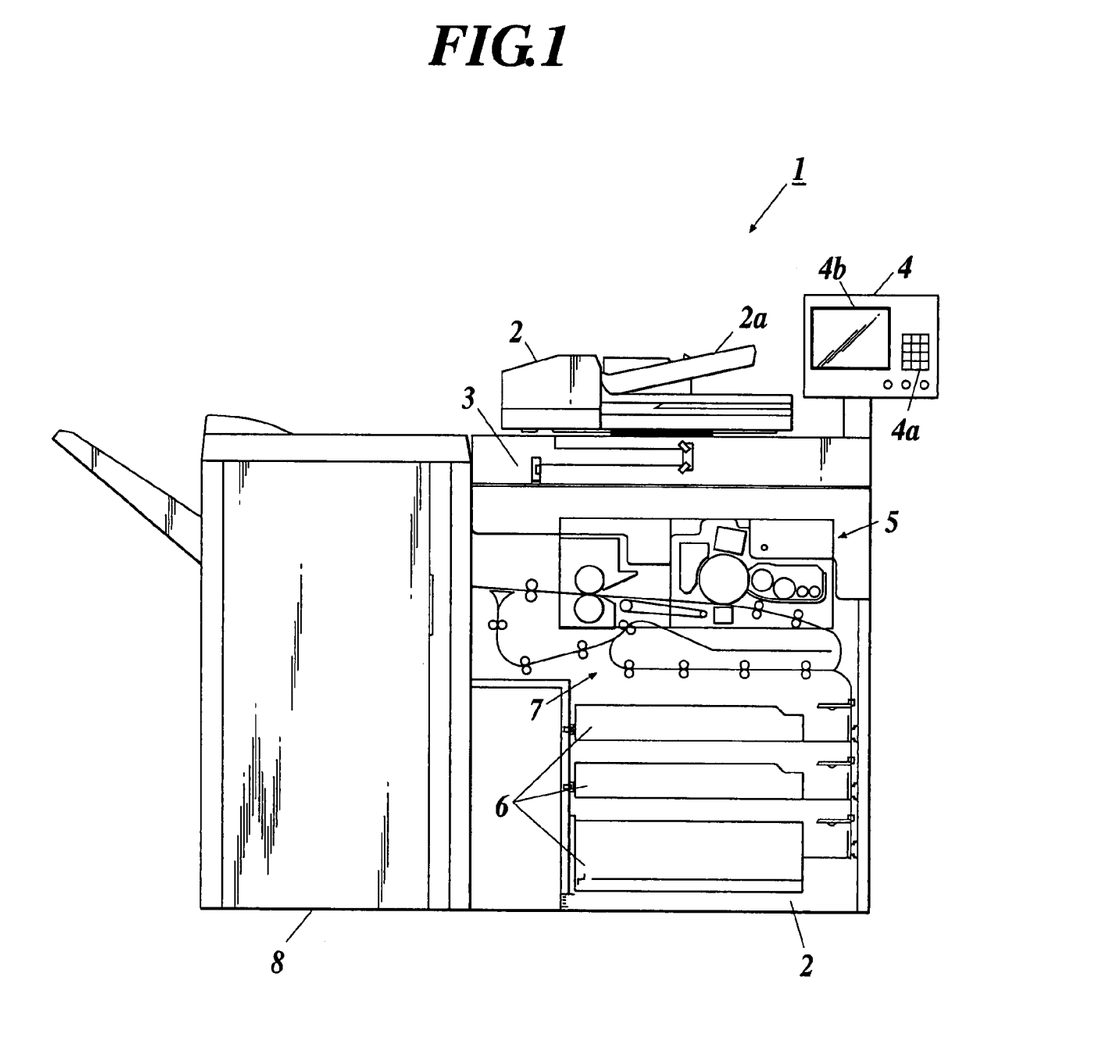
FIG. 1 is a schematic sectional elevational view of an image forming apparatus according to a preferred embodiment of the present invention.

FIG. 1 is a schematic elevational sectional view of an image forming apparatus 1 according to the embodiment of the present invention. As shown in FIG. 1, the image forming apparatus 1 includes an automatic document feeder 2, a reading section 3, an operation display section 4, an image forming section 5, a paper feed tray 6, a conveyance section 7, and a post-processing section 8.

The automatic document feeder 2 automatically sends a document placed on a tray 2a to a reading position of the reading section 3. The reading section 3 comprises a scanner or the like. The reading section 3 irradiates the document located at the reading position with light and reads an image of the document, and obtains image data which is electronic data of the read image.

The operation display section 4 includes a start button, various input buttons 4a such as numeric buttons for setting the number of copies, and a liquid crystal display panel 4b. The liquid crystal display panel 4b includes a LCD (Liquid Crystal Display) and a touch panel covering the LCD.

The image forming section 5 forms an image on a sheet conveyed from the paper feed tray 6 based on the image data obtained by the reading section 3 by using an electrophotographic method. The sheet, on which the image is formed, is conveyed to the post-processing section 8 by the conveyance section 7.

The post-processing section 8 performs various post-processing such as staple processing, punching processing, folding processing and pasting processing, on a sheet sent from the image forming section 5. The image forming apparatus 1 may be equipped with the post-processing section 8 or may be provided independently of the post-processing section 8.

Figure 2:
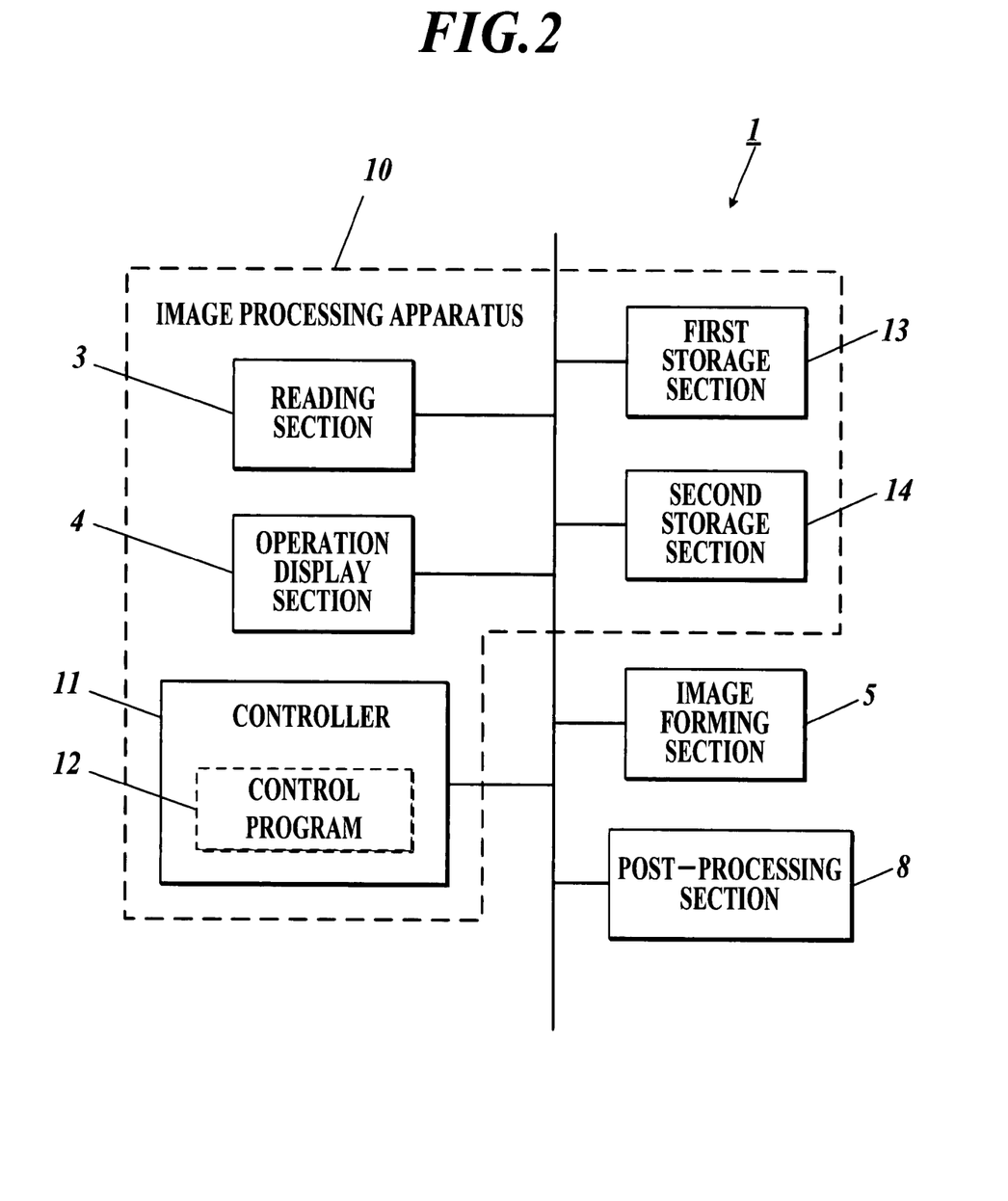
FIG. 2 is a block diagram showing a structure of an essential portion in the image forming apparatus of the embodiment.

FIG. 2 shows a structure of an essential portion in the image forming apparatus 1. As shown in FIG. 2, the image forming apparatus 1 includes an image processing apparatus 10, the image forming section 5 and the post-processing section 8.

As shown in FIG. 2, the image processing apparatus 10 includes the reading section 3, the operation display section 4, a controller 11, a first storage section 13 and a second storage section 14.

The controller 11 includes a CPU (Central Processing Unit), a ROM (Read Only Memory) for storing a control program 12 which is executed by the CPU, and a RAM (Random Access Memory). The CPU loads the control program 12 stored in the ROM into the RAM, and executes various processing together with the control program 12. Processing executed by the controller 11 will be explained in detail later.

The first storage section 13 includes a DRAM (Dynamic Random Access Memory), and stores image data obtained by the reading section 3 and image data processed by the controller 11.

The second storage section 14 stores preset information on a document to be placed on the tray 2a. The preset information includes first information on a position of the binding portion of the document, second information on high and low in page number between two pages, partitioned along the binding portion, on one face of each of the sheets, or ascending order or descending order of page number on one side of the binding portion of a stack of the sheets, and third information on one face out of faces of the sheets, from which a reading operation by the reading section is started.

Figure 3:
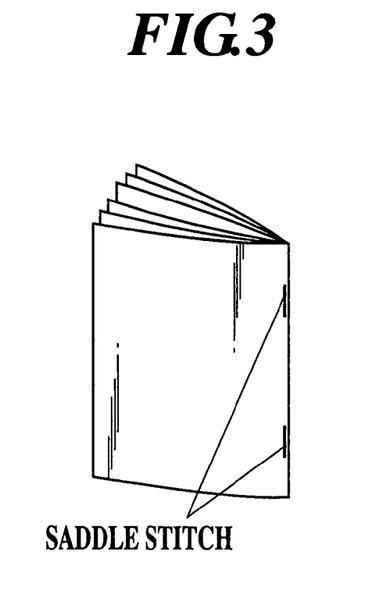
FIG. 3 is a diagram showing a saddle stitch document to be copied.

FIG. 3 is a diagram showing one example of a saddle stitch type document ("saddle stitched document", hereinafter) to be copied in the embodiment. The saddle stitched document shown in FIG. 3 comprises a plurality of (three) sheets with creases at central portions of the sheets. The sheets are folded along the creases and are bound together by the staple processing and the like to form as a brochure.

Figure 4:
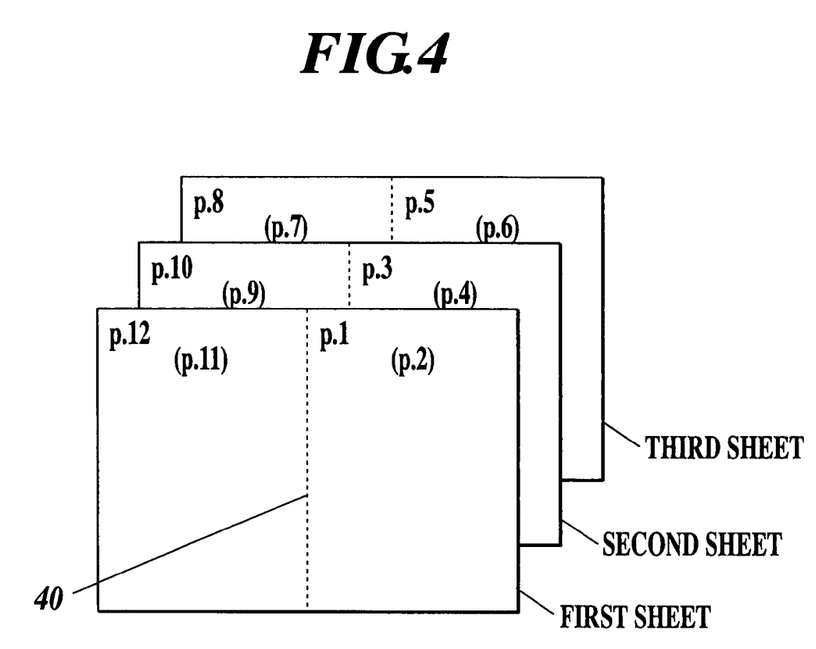
FIG. 4 is a diagram showing each of sheets constituting the saddle stitch document shown in FIG. 3.

FIG. 4 shows the sheets in two-page spread in a state where fasteners (e.g., staples) of the saddle stitched document shown in FIG. 3 are removed. In FIG. 4, each rectangular in solid line shows one sheet of a document, and each central broken line of the sheet shows a binding portion 40 (stapled portion) of the saddle stitched document. In FIG. 4, p.1, p.2, . . . denote page numbers. Page numbers without brackets show front pages, and page numbers with brackets show back pages.

In FIG. 4, the most frontward sheet is called a first sheet, next sheets are called, a second sheet and a third sheet, respectively. The front cover is the first page (page 1), and the back cover is the last page (page 12). As is clear from FIG. 4, the document shown in FIG. 4 is so-called right-opening (for horizontal writing).

Contents such as sentences or drawings are shown in each page of the sheets, and images of the contents are to be copied at the time of copying. Blank pages may exist depending upon a structure of the document, but the blank pages are also regarded as images to be copied here. Even if one drawing is shown in two-page spread of the saddle stitch document, left page and right page partitioned along the binding portion 40 are regarded as independent of each other.

In this embodiment, a case in which the following copying operation is executed will be considered. First, staples of a saddle stitched document are removed, each of the sheets constituting the document are placed on the tray 2a of the automatic document feeder 2 in two-page spread in the same order as that of the saddle stitched document, and images of front and back faces of each sheets are read by the reading section 3. The operation for copying an image corresponding to one page of the document on one face of a sheet will be carried out for both faces of sheets in page order. With this operation, a stack of double-sided copied papers can be obtained. After that, one edges of the stack of sheets corresponding to the binding portion 40 of the document is stapled or pasted by the post-processing section 8 to make a brochure shaped duplicate of the document.

Figure 5:
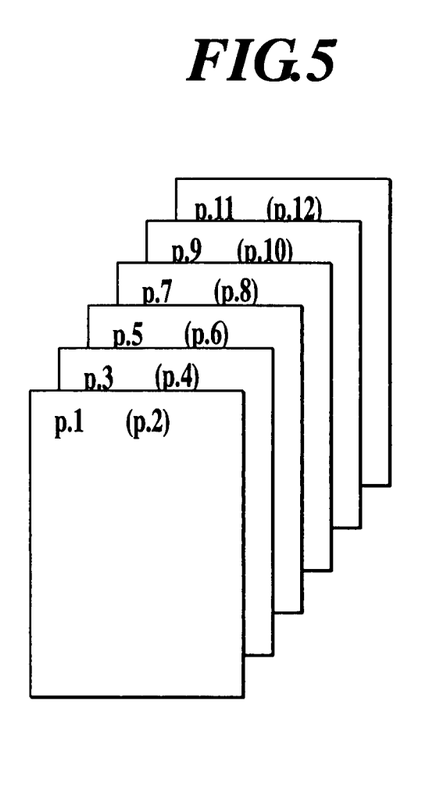
FIG. 5 is a diagram showing an example of a stack of copied papers obtained by double-sided copying the saddle stitch document shown in FIG. 3.

For example, if three sheets of the document shown in FIG. 4 are double-sided copied in page order, a stack of six sheets are obtained as shown in FIG. 5. In FIG. 5 also, page numbers without brackets show front pages, and page numbers with brackets show back pages.

Next, a processing executed by the controller 11 of the image processing apparatus 10 in accordance with the control program 12 will be explained.

The controller 11 stores image data of the document obtained by the reading section 3 in the first storage section 13. The image data is divided into a plurality of pieces of image data with respect to each face of the sheets of the document. The controller 11 further divides the piece of the image data stored in the first storage section 13 into a plurality of image area corresponding to pages of the document, and again stores pieces of page image data independently of each other in the first storage section 13. Then, the controller 11 respectively gives identifiers (page numbers) showing the page order to the pieces of the divided page image data, and determines an image forming method to be performed on papers and a post-processing method to be performed on a stack of copied papers. Then, the controller 11 outputs control command signals to the image forming section 5 and the post-processing section 8.

In order to double-sided copy on the sheets in page order of the document, it is necessary for the controller 11 to determine a page arrangement of each of the sheets constituting the document and to determine information concerning the page order. Thus, designation shown in the following [1] to [3] is required.

[1] Designation of Position of Binding Portion

When a position of the binding portion of the document is designated, it is possible to obtain information concerning an arrangement direction of images of the document with respect to conveyance direction of the document (i.e., information concerning whether the images of the document are arranged in the same direction as the conveyance direction of the document or are arranged in an orthogonal direction to the conveyance direction).

Figure 6:
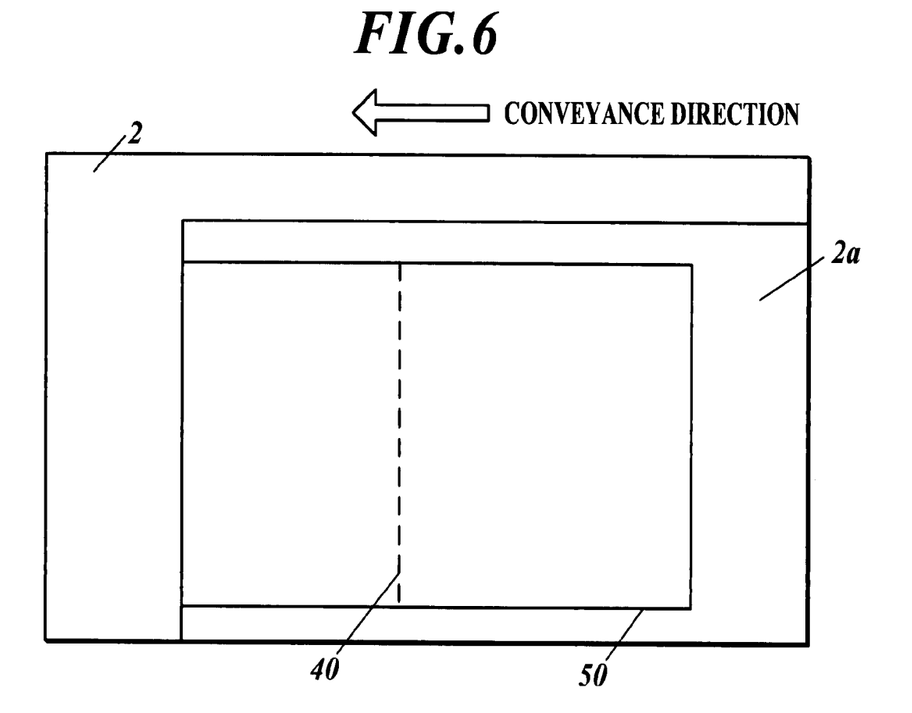
FIG. 6 is a diagram showing a state where a document is placed on a tray of an automatic document feeder.
Figure 7:
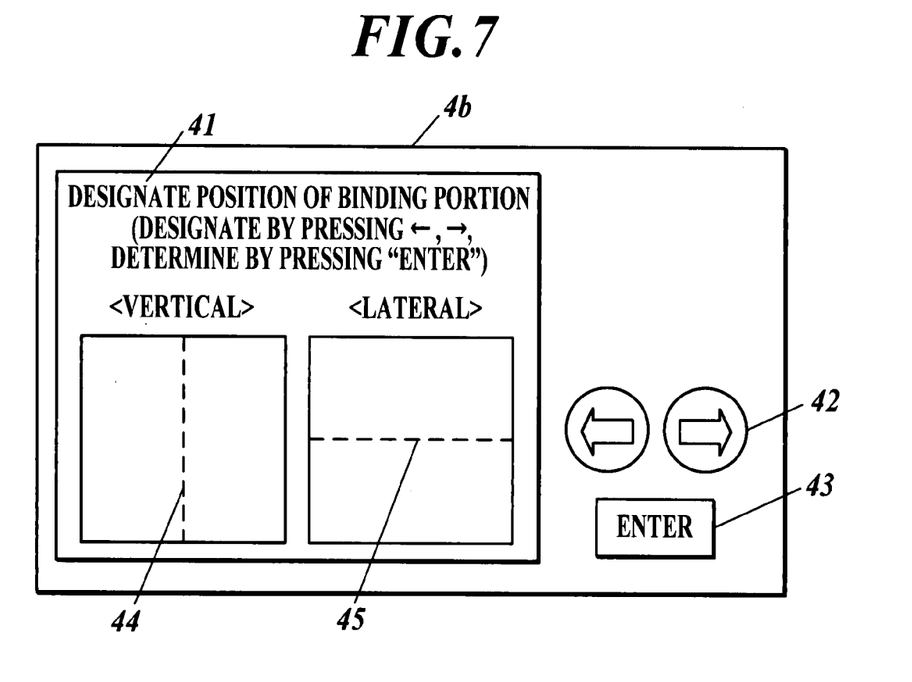
FIG. 7 is a diagram showing one example of a screen for designating a position of a binding portion of a document.

The position of the binding portion of the document is designated using the liquid crystal display panel 4b for example. FIG. 6 shows a state where a document 50 is placed on the tray 2a of the automatic document feeder 2. FIG. 7 shows one example of a screen 41 displayed on the liquid crystal display panel 4b for designating a position of the binding portion 40 of the document 50.

In the screen 41 shown in FIG. 7, it is possible to select one of two ways of binding portions. Assume that the conveyance direction of the document 50 is the same as a horizontal direction (lateral direction) of the screen 41. If the binding portion 40 is formed in a direction perpendicular to the conveyance direction of the document 50, a binding portion 44 shown with "vertical" is designated on the screen 41. If the binding portion 40 is formed in the same direction as the conveyance direction of the document 50, a binding portion 45 shown with "lateral" is designated on the screen 41. The position of the binding portion 40 of the document 50 is designated by operating cursor buttons 42 and an ENTER button 43 displayed on the liquid crystal display panel 4*b*.

In the case of a saddle stitch document, a binding portion is generally provided on a line vertically bisecting a long side of the document, but in the case of a document having no regular shape and size (such as various brochures), the binding portion may be provided on a line vertically bisecting a short side of the document in some cases. If a position of a binding portion of a document is fixed, a desired brochure cannot be formed in some cases. Therefore, a binding portion of a document can be selected in this embodiment.

By designating the position of the binding portion 40 of the document 50 in this manner, a boundary line between two pages on one face of one sheet becomes clear, and an image area corresponding to one page can be determined. This makes it possible to divide image data of one face of one sheet obtained by the reading section 3 into two independent image data.

[2] Designation of High and Low in Page Number (Ascending Order or Descending Order)

To specify page numbers of a document, one of the following (a) and (b) is designated: (a) high and low in page number (ascending order or descending order) between two pages, partitioned along a binding portion, on one face of each of the sheets of the document; and (b) ascending order or descending order of page number on one side of the a binding portion of a stack of sheets of the document.

In the case of (a), on a front face of the second sheet shown in FIG. 4, the right side of the binding portion 40 is p.3 and the left side of the binding portion 40 is p.10. On the back face, the right side of the binding portion 40 is p.4, and the left side of the binding portion 40 is p.9. Since the page arrangement like this is applied to any sheets of the document, the page order of each faces of the sheets is ascending order from right to left. Thus, in the case of the document shown in FIG. 4, it is designated that the page order is ascending order from right to left.

In the case of (b), on the right side of the binding portion 40 of the second sheet shown in FIG. 4, the front face is p.3 and the back face is p.4, and the pager order is ascending order. The page order of the first sheet and the third sheet are also ascending order on the right side of the binding portion 40. Moreover, the page order between the first sheet and the second sheet, and the page order between the second sheet and the third sheet are also ascending order on the right side of the binding portion 40. On the other hand, on the left side of the binding portion 40 of the second sheet shown in FIG. 4, the front face is p.10 and the back face is p.9, and the pager order is descending order. The page order of the first sheet and the third sheet are also descending order on the left side of the binding portion 40. Moreover, the page order between the first sheet and the second sheet, and the page order between the second sheet and the third sheet are also descending order on the left side of the binding portion 40. Therefore, the page order of the document shown in FIG. 4 is ascending order on the right side of the binding portion 40 and is descending order on the left side of the binding portion 40. Accordingly, in the case of the document shown in FIG. 4, it is designated that the page order is ascending order from the front face toward the back face on the right side or is descending order from the front face toward the back face on the left side.

[3] Designation of One Face from which Reading Operation is Started

By the above designation, the page order of the document can be relatively determined. All of the page numbers, however, cannot be determined only by the above designation. This is because that in the case of (a) shown in FIG. 4, it is impossible to determine whether the page order is ascending order or descending order in the right side or left side of the binding portion 40. In FIG. 4, in the case of (b), it is unclear which one of the right side and the left side of the binding portion 40 comes first, i.e., which one of the right side and the left side includes the first page.

In order to make it possible to determine all of the page numbers, it is necessary to specify one face out of faces of the sheets constituting the document, having the first page and the last page (p.1 and p.12) or continuous pages on one face (p.6 and p.7).

Thus, designation corresponding to page numbers is made with respect to reading order of the sheets constituting document. That is, in this embodiment, a user designates, by means of the operation display section 4, whether reading operation is started from a face including the front cover or the back cover, or from a face including a central spread (face having continuous page numbers), which corresponds to a central portion of the document. By virtue of this designation, in FIG. 4, since it is clear that the first sheet includes the first page and the last page, and that a page number on the right side of the binding portion 40 is smaller than that on the left side by the designation (a), it is possible to determine that the right side of the first sheet is the first page. Moreover, since it is clear that the first sheet includes the first page and the last page, and that the right side of the document has the ascending order by the designation (b), it is possible to determine that the right side on the first sheet is the first page.

Here, in order to determine all of the page numbers, it is necessary that a total number of sheets is recognized. This is because if a total number of sheets is unknown, it is not possible to determine a total number of pages. Thus, it is not possible to determine a position at which the right side is switched to the left side based on the total number of pages when the page numbers are given. This position is a portion between N-th page and N+1-th page when the total number of pages of the document is 2N.

In FIG. 4, this position corresponds to a back face of the third sheet. If the position, where the image of the document is switched, cannot be determined, although p.6 can be given to the right side on the back face of the third sheet, it is not possible to determine that the left side is p.7. As a result, a page number cannot be given.

In general, however, in the case of an automatic document reading device, by sending a signal representing that there are no more sheets on a document placing section (tray 2*a* in this embodiment), it is possible to recognize that the reading operation for all the sheets has been completed. When the reading operation is carried out manually, the completion of the reading can be recognized by pressing a "reading operation completion button" on an operation panel. This makes it possible to determine a total number of pages.

Thus, by the above-mentioned designation of [1] to [3], the controller 11 can divide image data of a document obtained by the reading section 3 into pieces of page image data page by page, and respectively give identifiers to the pieces of the divided page image data following a page order of the document.

Next, reading order of sheets constituting the document will be explained in detail.

The reading order of sheets is determined mainly by a structure of the automatic document feeder 2, and is classified broadly into the following two categories:

[α] when the sheets are conveyed in accordance with arrangement of pages (when the sheets are conveyed such that the reading operation is started from one of two pages constituting one face of a sheet); and

[β] when the sheets are conveyed such that two pages of one face of a sheet are simultaneously read from an upper end or a lower end of the sheet.

When the document is conveyed as in the manner [α], there are eight kinds (A) to (H) of reading orders of the sheets shown in FIG. 4 depending upon a structure of the automatic document feeder 2, or a structure and a function of a device which forms binding portions of a brochure.

(A) When images of a first sheet are read in the order of p.1, p.12, p.2, p.11, and a second sheet and a third sheet are read in the same manner, (B) When images of a first sheet are read in the order of p.1, p.12, p.11, p.2, and a second sheet and a third sheet are read in the same manner, (C) When images of a first sheet are read in the order of p.12, p.1, p.11, p.2, and a second sheet and a third sheet are read in the same manner, (D) When images of a first sheet are read in the order of p.12, p.1, p.2, p.11, and a second sheet and a third sheet are read in the same manner, (E) When images of a third sheet are read in the order of p.6, p.7, p.5, p.8 and a second sheet and a first sheet are read in the same reading order, (F) When images of a third sheet are read in the order of p.6, p.7, p.8, p.5 and a second sheet and a first sheet are read in the same manner, (G) When images of a third sheet are read in the order of p.7, p.6, p.8, p.5 and a second sheet and a first sheet are read in the same manner, and (H) When images of a third sheet are read in the order of p.7, p.6, p.5, p.8 and a second sheet and a first sheet are read in the same manner.

Theoretically, a method for changing the reading order with respect to each sheet is possible besides the reading orders shown in (A) to (H), but since the general versatility is inferior in view of practicality, explanation thereof will be omitted here.

Figure 8:
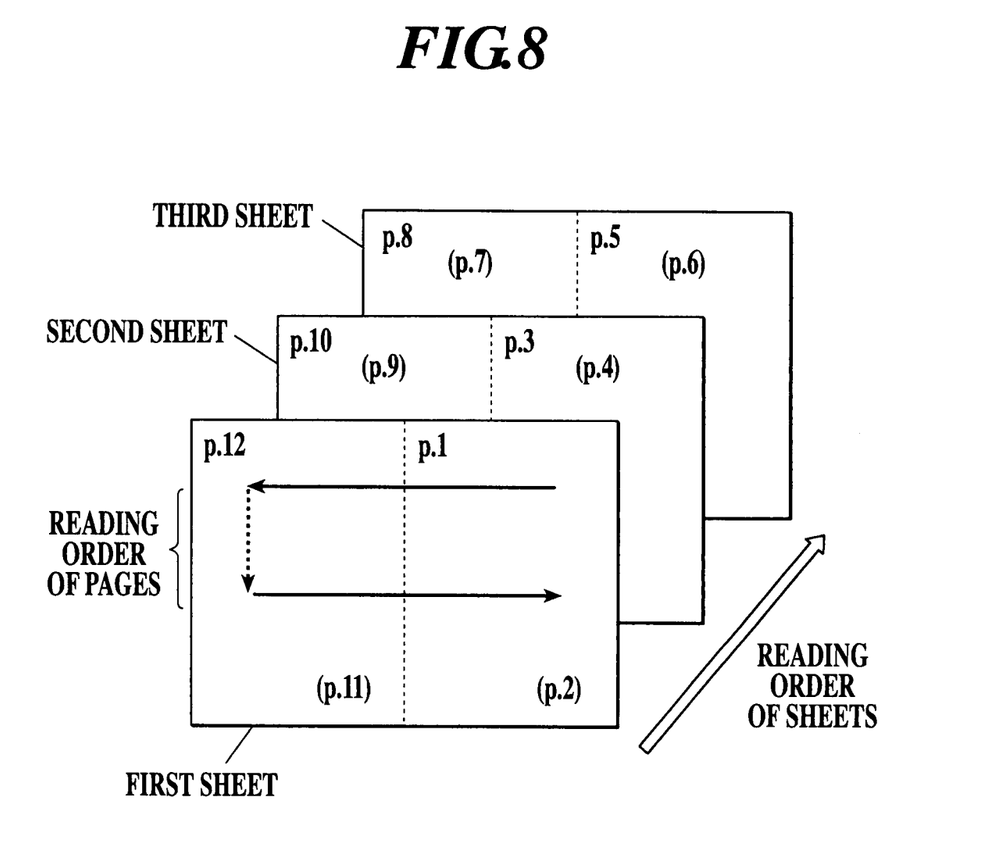
FIG. 8 is a diagram showing one example of a reading order of a document.

In the case of the reading order (B), as shown in FIG. 8, the first sheet is read in the order of p.1, p.12, and then is inverted. As the first sheet is inverted, a front end and a rear end of the sheet are switched with respect to the reading direction and thus, the sheet is read in the order of p.11, p.2 after the inversion.

When a document is conveyed as in the manner [β], the first sheet in FIG. 8 is first read from the upper end (lower end) of the face of p.1 and p.12, and then is inverted. After the first sheet is inverted, the sheet is read from the lower end (upper end) of the face of p.2 and p.11. In this case, an image obtained by reading one face of the sheet and an image obtained by reading the other face are vertically opposite to each other. Thus, these two images are divided into mutually independent images with respect to each page, and then the images of one face of the sheet may be rotated 180 degrees.

When the manner of placing document is uniquely determined due to constraint of function, the designation of [1] to [3] is not made. In this case, since the second storage section 14 stores the first setting information on a position of the binding portion of the document, the second setting information on high and low in page number between two pages, partitioned along the binding portion on one face of each of the sheets, or ascending order or descending order of page number on one side of the binding portion of a stack of the sheets, and the third setting information on one face out of faces of the sheets, from which a reading operation by the reading section is started (i.e., information similar to the designated information of [1] to [3]), the controller 11 can respectively give page numbers to the pieces of the divided page image data based on the first to third setting information.

Next, a calculation method of page numbers of a document will be explained in detail. A case in which a document is read in the reading order (A) will be explained, but the same calculation method as (A) can also be applied to (B) to (H).

When the document is read in the reading order (A), the images of the document are stored in the first storage section 13 in the order of p.

1, p.12, p.2, p.11, p.3, p.10, p.4, p.9, p.5, p.8, p.6, p.7. If the total number of pages is 2n, the images are read in the following page order:

1, 2n, 2, 2n−1, 3, 2n−2, . . . m, 2n−m+1, . . . n, n+1 (m=1, 2, . . . , n).

Therefore, if an image which is read M-th corresponds to N-th page (i.e., page number is N), N is given by the following equations (1) and (2):

$$N=(M+1)/2 \text{ (M: odd number)} \qquad (1)$$

$$N=2n-(M/2-1) \text{ (M: even number)} \qquad (2)$$

Next, an image forming processing executed by the image forming apparatus 1 will be explained with reference to a flowchart of FIG. 9 as the operation in the embodiment. A series of processing for obtaining a stack of double-sided copied papers as shown in FIG. 5 from a saddle stitched document as shown in FIGS. 3 and 4 and carrying out post-processing will be explained below as the image forming processing.

Before starting the image forming processing, a user removes staples at the central portion of the saddle stitched document, and disassembles the saddle stitched document into a plurality of sheets. The disassembled document is placed on the tray 2a of the automatic document feeder 2.

When the document is placed on the tray 2a of the automatic document feeder 2 and reading operation for double-sided copy is instructed through the operation display section 4, the document is conveyed to the reading section 3, both faces of each of the sheets are read, and image data of the document is obtained (step S1). The image data is divided into pieces of image data with respect to each face of the sheets. Next, identifiers are respectively given to the pieces of the image data obtained by the reading operation in step S1, and the pieces of the image data are stored in the first storage section 13 (step S2).

Next, as shown in FIG. 7, the screen 41 for prompting the user to designate a position of a binding portion of a sheet is displayed on the liquid crystal display panel 4b of the operation display section 4, and a position (partitioning line between adjacent pages) of a binding portion of the sheet is designated through operation on the liquid crystal display panel 4b (step S3). Then, an image area corresponding to one page is determined based on the designated position of the binding portion (step S4).

Next, high and low (ascending order or descending order) in page number of adjacent two pages on one face of each of the sheets, or ascending order or descending order of page number on one side of the binding portion of a stack of the sheets is designated through operation of the operation display section 4 (step S5).

Then, one face out of faces of the sheets, from which a reading operation is started, is designated through operation on the operation display section 4 (step S6). In step S6, more concretely, information representing whether reading operation is started from a face including the front cover or the back cover, or from a face including a central spread (face having continuous page numbers), which corresponds to a central portion of the document.

Next, the pieces of the image data stored in the first storage section 13 are further divided into pieces of page image data page by page, and the pieces of the divided page image data is stored in the first storage section 13 in such a manner that the pieces of the divided page image data can be read individually based on the image area corresponding to one page determined in step S4 (step S7).

Next, page numbers and one edges of papers as binding portions are determined with respect to the pieces of the divided page image data based on the designation in steps S3, S5 and S6. Then, identifiers representing the edges corresponding to the binding portions, and identifiers corresponding to page numbers of the actual document are respectively given to the pieces of the divided page image data (step S8).

For example, when the above-described (A) is determined as the reading order of the document by designation in step S6, the page numbers are determined in accordance with the equations (1) and (2) in step S8. One of four edges of a paper corresponding to the binding portion (partitioning line between two pages) of the document, which is designated in step S3, is determined as a binding portion of the paper.

When step S8 is completed, images are formed on both faces of papers by the image forming section 5, based on the pieces of the divided page image data in the page order in accordance with page numbers respectively given to the pieces of the divided page image data so that one page of the document corresponds to one face of the paper (step S9).

The binding portions of a stack of copied papers obtained by the image forming processing in step S9 are subjected to post-processing such as staple processing and pasting processing by the post-processing section 8 (step S10), and the image forming processing is completed.

The post-processing in step S10 is carried out such that the position where the pasting processing is carried out and the edge corresponding to the binding portion of the document match with each other. When a stack of copied papers shown in FIG. 5 are obtained, left sides of the papers (sides corresponding to the binding portion 40 in FIG. 4) are the binding portions, and they are subjected to the staple processing.

Figure 9:
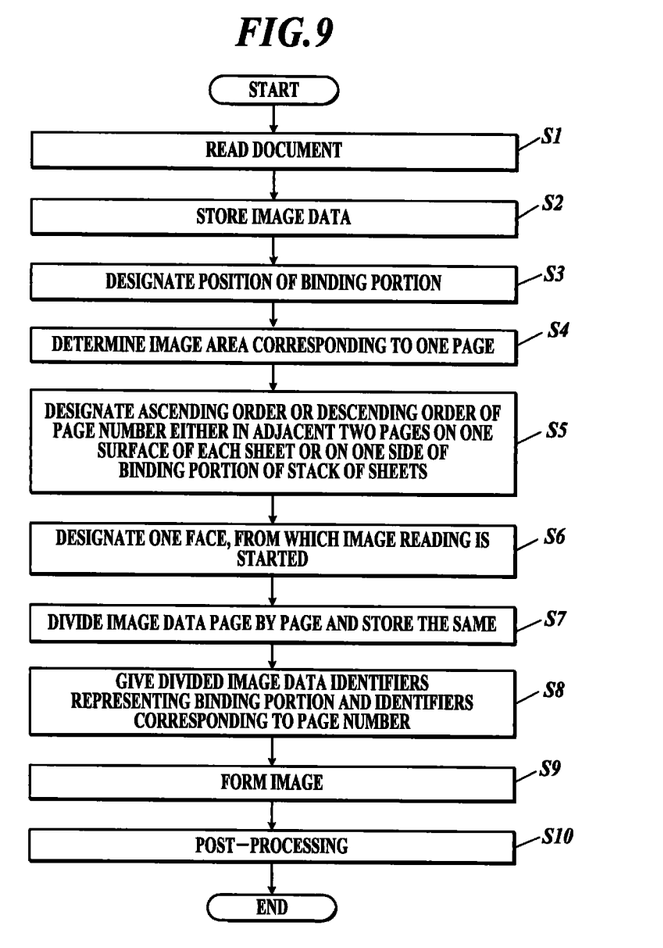
FIG. 9 is a flowchart showing an image forming processing which is executed by the image forming apparatus of the embodiment.

In the flowchart in FIG. 9, the designation in steps S3, S5 and S6 are made after the reading operation of the document by the reading section 3, but the document may be read after the designation.

In the case of an image forming apparatus 1 in which the manner of placing a document is uniquely determined due to constraint of function, the designation in steps S3, S5 and S6 in FIG. 9 is not made, and the processing in steps S4, S7 and S8 is carried out based on the first to third setting information stored in the second storage section 14.

In the case of the image forming apparatus 1 having such a constraint, it is necessary that the manner of placing the document on the tray 2a corresponds to the setting information stored in the second storage section 14. For example, in the case of an apparatus in which the conveyance direction and the reading direction of the document are orthogonal to each other, and one of reading lines of the document by the reading section 3 is used as a partitioning line for dividing an image on the document, it is necessary to place the document such that the binding portion of the saddle stitched document matches with the reading line direction (i.e., such that the binding portion is orthogonal to the conveyance direction of the document). When the setting information is set such that the document is read from a face having a front cover and a back cover (a face of p.1 and p.12 of the first sheet in FIG. 4), it is necessary to place the document such that the reading operation is started from this face.

In the embodiment, it is explained on condition that the document is so-called a right-opening one (for horizontal writing), but the controller 11 does not obtain information on the fact that the document to be copied is the right-opening one and the upper ends of the sheets match with upper portions of pages in FIG. 4. That is, even if the document is left-opening one for vertical writing (vertically written sentences from left lower side to right upper side in p.1 in FIG. 4 are vertically reversely image-formed), the same conditions as those of the document can be kept for the page order of a stack of copied papers and the position of edges corresponding to the binding portion. Therefore, a correct brochure-shaped duplicate can be obtained.

Figure 10:
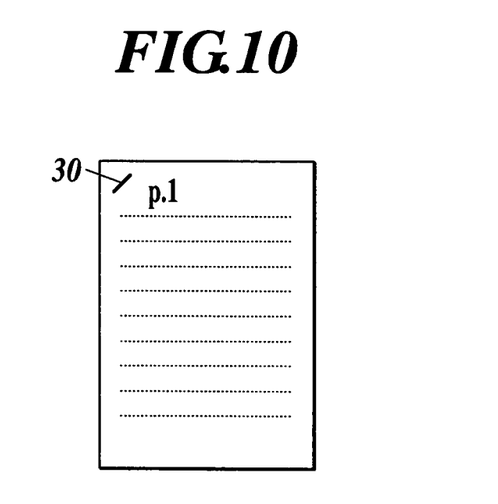
FIG. 10 is a diagram showing a stack of copied papers, whose left upper corners are stapled together, obtained by copying a right-opening document.
Figure 11:
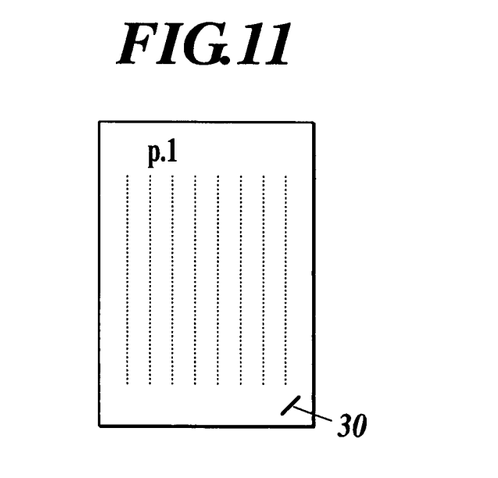
FIG. 11 is a diagram showing a stack of copied papers whose right lower corners are stapled together, obtained by copying a left-opening document.

For example, in the post-processing section 8, when upper left corners of a stack of copied papers placed at right location are stapled using a staple 30, if the document is of right-opening type, the post-processing is carried out in the correct state as shown in FIG. 10. However, since lower right corners of a stack of copied papers are stapled as a left-opening type brochure as shown in FIG. 11, it is extremely inconvenient for actual use.

Figure 12:
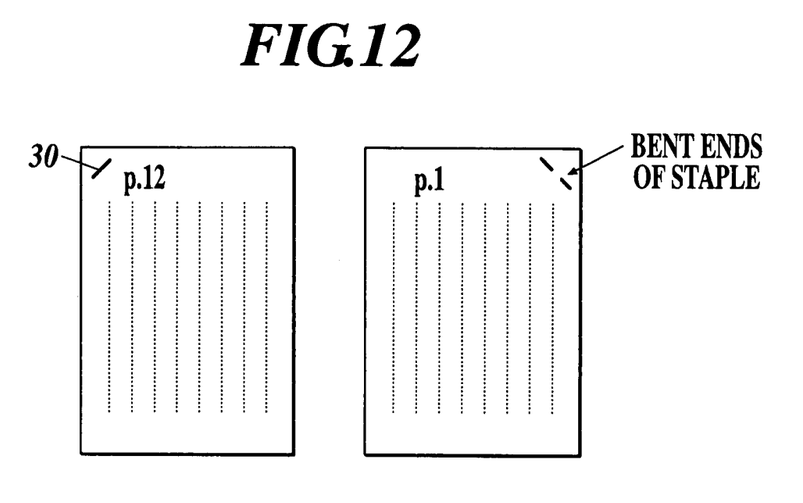
FIG. 12 is a diagram of a state where a staple penetrates a stack of copied papers from a back side thereof and the staple is bent on a front side thereof.

To solve such a problem, it is conceived that the front and back direction and the order when copied papers are discharged are changed and upper left corners of a stack of copied papers are stapled. In general, a staple penetrates the front cover and its tip ends are bent at the back cover. However, if the front and back direction and the order when the copied papers are discharged are changed, in the case of the left-opening brochure, the staple 30 penetrates from the back cover and the tip ends of the staple 30 are bent at the front cover as shown in FIG. 12. Therefore, outward appearance of the finished brochure is not excellent.

Hence, it is conceived that a user can freely designate a vertical or lateral direction of a document, and it is determined whether the document is of right-opening type or left-opening type based on the designation, and processing for a binding portion is determined. More specifically, a message for urging a user to input (designate) information that one edge out of four edges of the document corresponds to which one of left, right, upper and lower of the document (e.g., the upper end of the document corresponds to which end of a sheet placed on the automatic document feeder 2) is displayed on the liquid crystal display panel 4b, and the controller 11 determines whether a document is of right-opening type or left-opening type based on information designated by a user using the panel operation.

Figure 13:
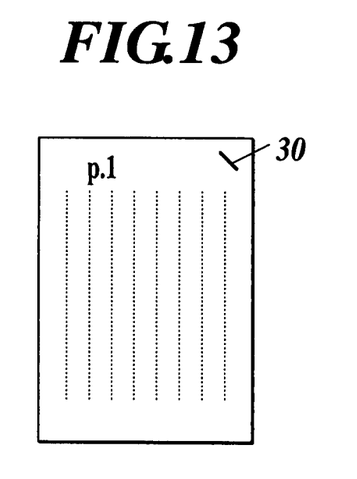
FIG. 13 is a diagram showing a stack of copied papers whose right upper corners are stapled together, obtained by copying a left-opening document.

For example, assume that the post-processing section 8 carries out the staple processing only at one upper right corner of the copied papers, and the staple 30 penetrates the papers from above. In this case, when the controller 11 determines that the document is of left-opening type based on various information designated through the liquid crystal display panel 4b, the controller 11 outputs command signals for conveying the papers in the same direction as the short sides of the papers and carrying out the staple processing. Thus, a duplicate having an excellent outward appearance as a left-opening brochure can be obtained as shown in FIG. 13.

That is, the controller 11 determines whether the document is of right-opening type or left-opening type based on the reading order of sheets constituting the document, the page order of the sheets, and the vertical direction of the document. Then, the controller 11 determines a position where the staple processing is carried out and a direction in which a staple penetrates, and sends command signals for image forming and post-processing to the image forming section 5 and the post-processing section 8, respectively.

It is also possible to employ such a configuration that a user can freely designate a position of a binding portion of a copied paper and the controller 11 may output a command signal for stapling the designated position of the paper. For example, it is conceived that when vertically written sentences and horizontally written sentences are mixed in a document which is formed into a right-opening brochure, a user may desire to form a left-opening brochure from this right-opening brochure.

When drawings or tables are shown in portions close to the edge of the document, if positions of binding portions of a stack of copied papers are fixed, portions of the drawings or tables may reach the binding portion which is stapled or pasted, and, thus, it may not be possible to see the portions of the drawings or tables. In such a case, it is convenient that a binding portion is arranged at a margin of a copied paper.

Then, a user may operate the operation display section 4 and freely designate a position of a binding portion of a paper, and the controller 11 may send command signals for processing the designated position as the binding portion to the image forming section 5 and the post-processing section 8.

As described above, according to the image forming apparatus 1 of the embodiment, the following information is designated or pre-defined: a position of a binding portion of a document; high and low in page number; and one face out of faces of the sheets, from which reading operation is started. Based on this information, image data of a document obtained by the reading section 3 is divided into pieces of page image data page by page, and identifiers corresponding to page numbers of the document are respectively given to the pieces of the divided page image data, and then image forming is performed in accordance with page order by the image forming section 5. This makes it possible to easily obtain substantially the same duplicate as a document without troublesome manual work.

It will be apparent that various changes and modifications may be made by persons skilled in the art, without departing from the scope of the invention.

For example, even if the image forming apparatus does not have the automatic document feeder 2, this embodiment can be applied if the reading order of document is the same as that when the document is sent out from the automatic document feeder 2.

In the embodiment, an object to which the control program 12 of the controller 11 is applied is not limited to the image forming apparatus such as a copier, and the object may be a general computer. If the object is the general computer, a frame or an annotation may be added to every page, and a plurality of image data sets may be arranged on one page.

The present U.S. patent application claims a priority under the Paris Convention of Japanese patent application No. 2007-110573 filed on Apr. 19, 2007 which shall be a basis of correction of an incorrect translation.

Although various exemplary embodiments have been shown and described, the invention is not limited to the embodiments. Therefore, the scope of the invention is intended to be limited solely by the following claims.

What is claimed is:

1. An image processing apparatus, comprising:
a reading section to read a brochure-shaped document and to obtain image data of the document, the document including a plurality of sheets and having a binding portion provided along a line which divides the document into two, wherein each of the sheets has two pages on one face, the two pages being divided by the binding portion;
a storage section to store the image data obtained by the reading section;
an operating section to accept an operating instruction by a user to designate each of:
a position of the binding portion of the document, a higher or lower page number between two pages partitioned along the binding portion on one face of each of the sheets, or an ascending order or a descending order of the page number on one side divided by the binding portion of a stack of the sheets, and
one face of the sheets from which a reading operation by the reading section is started; and
a controller, in accordance with the designation through the operating section, to determine an image area corresponding to one page of the document, to divide the image data into pieces of page image data page by page based on the image area and to restore the pieces of the divided page image data in the storage section, and to respectively give identifiers to the pieces of the divided page image data following a page order of the document.

2. The image processing apparatus of claim 1, wherein the controller determines one edge of a paper on which an image is to be formed based on the image data, as a binding portion of the paper based on the position of the binding portion of the document.

3. The image processing apparatus of claim 1, wherein
a vertical direction or a lateral direction of the document is further designated through the operating section, and
the controller determines one edge of a paper on which an image is to be formed based on the image data, as a binding portion of the paper based on the directional designation through the operating section.

4. The image processing apparatus of claim 1, wherein
a position of a binding portion of a paper on which an image is to be formed based on the image data, is further designated through the operating section, and the controller determines one edge of the paper as the binding portion of the paper based on the binding portion designation through the operating section.

5. An image forming apparatus, comprising:
the image processing apparatus of claim 1; and
an image forming section to respectively form images on papers based on the pieces of the divided page image data and the corresponding identifiers.

6. A non-transitory computer-readable storage medium storing a computer program, the computer program, when executed on a computer, causing the computer to function as:
a reading section to read a brochure-shaped document and to obtain image data of the document, the document including a plurality of sheets and having a binding portion provided along a line which divides the document into two, wherein each of the sheets has two pages on one face, the two pages being divided by the binding portion;
a storage section to store the image data obtained by the reading section;

an operating section to accept an operating instruction by a user to designate each of:
- a position of the binding portion of the document,
- a higher or lower page number between two pages partitioned along the binding portion on one face of each of the sheets, or an ascending order or a descending order of the page number on one side divided by the binding portion of a stack of the sheets, and
- one face of the sheets from which a reading operation by the reading section is started; and a controller, in accordance with the designation through the operating section, to determine an image area corresponding to one page of the document, to divide the image data into pieces of page image data page by page based on the image area and to restore the pieces of the divided page image data in the storage section, and to respectively give identifiers to the pieces of the divided page image data following a page order of the document.

7. The storage medium of claim 6, wherein the controller determines one edge of a paper on which an image is to be formed based on the image data, as a binding portion of the paper based on the position of the binding portion of the document.

8. The storage medium of claim 6, wherein
a vertical direction or a lateral direction of the document is further designated through the operating section, and
the controller determines one edge of a paper on which an image is to be formed based on the image data, as a binding portion of the paper based on the directional designation through the operating section.

9. The computer program storage medium of claim 6, wherein
a position of a binding portion of a paper on which an image is to be formed based on the image data, is further designated through the operating section, and
the controller determines one edge of the paper as the binding portion of the paper based on the binding portion designation through the operating section.

10. An image processing apparatus, comprising:
a reading section to read a brochure-shaped document and to obtain image data of the document, the document including a plurality of sheets and having a binding portion provided along a line which divides the document into two, wherein each of the sheets has two pages on one face, the two pages being divided by the binding portion;
a first storage section to store the image data obtained by the reading section;
a second storage section to store each of:
- first setting information on a position of the binding portion of the document,
- second setting information on a higher or lower page number between two pages partitioned along the binding portion on one face of each of the sheets, or an ascending order or a descending order of the page number on one side divided by the binding portion of a stack of the sheets, and
- third setting information on one face of the sheets from which a reading operation by the reading section is started; and a controller, in accordance with the first to third setting information stored in the second storage section, to determine an image area corresponding to one page of the document, to divide the image data into pieces of page image data page by page based on the image area and to restore the pieces of the divided page image data in the first storage section, and to respectively give identifiers to the pieces of the divided page image data following a page order of the document.

11. The image processing apparatus of claim 10, wherein the controller determines one edge of a paper on which an image is to be formed based on the image data, as a binding portion of the paper based on the position of the binding portion of the document.

12. An image forming apparatus, comprising:
the image processing apparatus of claim 10; and
an image forming section to respectively form images on papers based on the pieces of the divided page image data and the corresponding identifiers.

13. A non-transitory computer-readable storage medium storing a computer program, the computer program, when executed on a computer, causing the computer to function as:
a reading section to read a brochure-shaped document and to obtain image data of the document, the document including a plurality of sheets and having a binding portion provided along a line which divides the document into two, wherein each of the sheets has two pages on one face, the two pages being divided by the binding portion;
a first storage section to store the image data obtained by the reading section;
a second storage section to store each of:
- first setting information on a position of the binding portion of the document,
- second setting information on a higher or lower page number between two pages partitioned along the binding portion on one face of each of the sheets, or an ascending order or a descending order of the page number on one side divided by the binding portion of a stack of the sheets, and
- third setting information on one face of the sheets from which a reading operation by the reading section is started; and a controller, in accordance with the first to third setting information stored in the second storage section, to determine an image area corresponding to one page of the document, to divide the image data into pieces of page image data page by page based on the linage area and to restore the pieces of the divided page image data in the first storage section, and to respectively give identifiers to the pieces of the divided page image data following a page order of the document.

14. The storage medium of claim 13, wherein the controller determines one edge of a paper on which an image is to be formed based on the image data, as a binding portion of the paper based on the position of the binding portion of the document.

* * * * *